United States Patent
Bing et al.

(10) Patent No.: US 10,881,232 B2
(45) Date of Patent: Jan. 5, 2021

(54) MODULAR MAT SYSTEM, MAT MODULES AND ASSOCIATED CONNECTION METHODS

(71) Applicant: Cintas Corporate Services, Inc., Cincinnati, OH (US)

(72) Inventors: Richard R. Bing, West Chester, OH (US); Patrick J. Chilenski, Cleves, OH (US); David S. Mesko, Wyoming, OH (US)

(73) Assignee: Cintas Corporate Services, Inc., Cincinnati, OH (US)

( * ) Notice: Subject to any disclaimer, the term of this patent is extended or adjusted under 35 U.S.C. 154(b) by 0 days.

(21) Appl. No.: 16/460,299

(22) Filed: Jul. 2, 2019

(65) Prior Publication Data
US 2020/0008600 A1    Jan. 9, 2020

Related U.S. Application Data

(60) Provisional application No. 62/694,478, filed on Jul. 6, 2018.

(51) Int. Cl.
*B32B 3/06* (2006.01)
*A47G 27/02* (2006.01)
*B32B 3/30* (2006.01)

(52) U.S. Cl.
CPC ............ *A47G 27/0293* (2013.01); *B32B 3/06* (2013.01); *B32B 3/30* (2013.01); *B32B 2250/02* (2013.01);
(Continued)

(58) Field of Classification Search
CPC ............... Y10T 428/17; Y10T 428/163; Y10T 428/164; A47G 27/02; A47G 27/04;
(Continued)

(56) References Cited

U.S. PATENT DOCUMENTS 3,751,327 A    8/1973    Hausler
5,330,806 A    7/1994    Bythewood et al.
(Continued)

FOREIGN PATENT DOCUMENTS

EP    0653179 A1    5/1995
EP    1048262 A2    11/2000
WO    2018038832 A1    3/2018

OTHER PUBLICATIONS

International Searching Authority; International Search Report and Written Opinion; PCT/US2019/40326; dated Oct. 4, 2019; 12 pgs.

*Primary Examiner* — Alexander S Thomas
(74) *Attorney, Agent, or Firm* — Wood Herron & Evans LLP

(57) ABSTRACT

A mat system is made up of multiple mat modules with interlocking features that allow for separate mat modules to be assembled into different patterns or shapes to cover larger areas as an area mat, define long pathways such as in hallways and customize the shape of the mat may be used to better fit the specific location. The mat modules are secured to each other to provide larger mat systems with a safer and better-looking transition. The mat modules are constructed such that there is a first connecting arrangement and a second connecting arrangement. When the mat modules are assembled, the first connecting arrangement on one mat module will assemble to the second connecting arrangement and an adjacent mat module to provide a secure and seamless connection between the mat modules. These connecting features can be integral to the mat modules or separate pieces.

22 Claims, 4 Drawing Sheets

(52) U.S. Cl.
CPC ....... *B32B 2471/04* (2013.01); *Y10T 428/163* (2015.01); *Y10T 428/164* (2015.01); *Y10T 428/17* (2015.01)

(58) Field of Classification Search
CPC .............. A47G 27/025; A47G 27/0293; A47G 27/0468; B32B 3/06; B32B 3/30; B32B 2471/04; E04F 15/02133; E04F 15/02138; E04F 428/198
See application file for complete search history.

(56) References Cited

U.S. PATENT DOCUMENTS

| | | | |
|---|---|---|---|
| 6,306,477 B1* | 10/2001 | Pacione | A47G 27/0293 428/62 |
| 6,645,597 B1 | 11/2003 | Swain | |
| 8,518,516 B1 | 8/2013 | Konasiewicz et al. | |
| 2003/0180499 A1 | 9/2003 | Kobayashi et al. | |
| 2004/0062899 A1* | 4/2004 | Kobayashi | B32B 5/24 428/48 |
| 2007/0184230 A1 | 8/2007 | Verrue et al. | |
| 2017/0037567 A1 | 2/2017 | Love et al. | |
| 2017/0136730 A1 | 5/2017 | Dawson et al. | |
| 2017/0251855 A1 | 9/2017 | Villano et al. | |
| 2017/0282498 A1 | 10/2017 | Love et al. | |

* cited by examiner

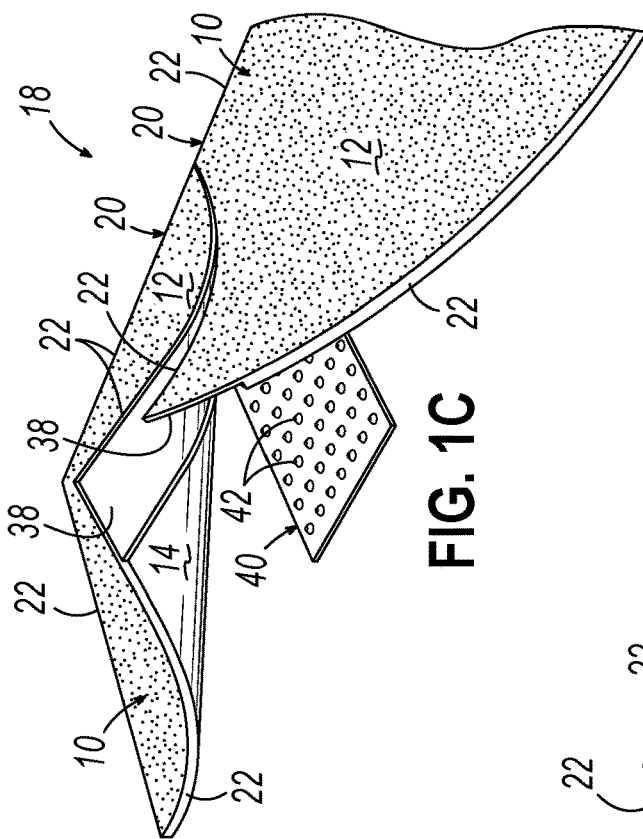
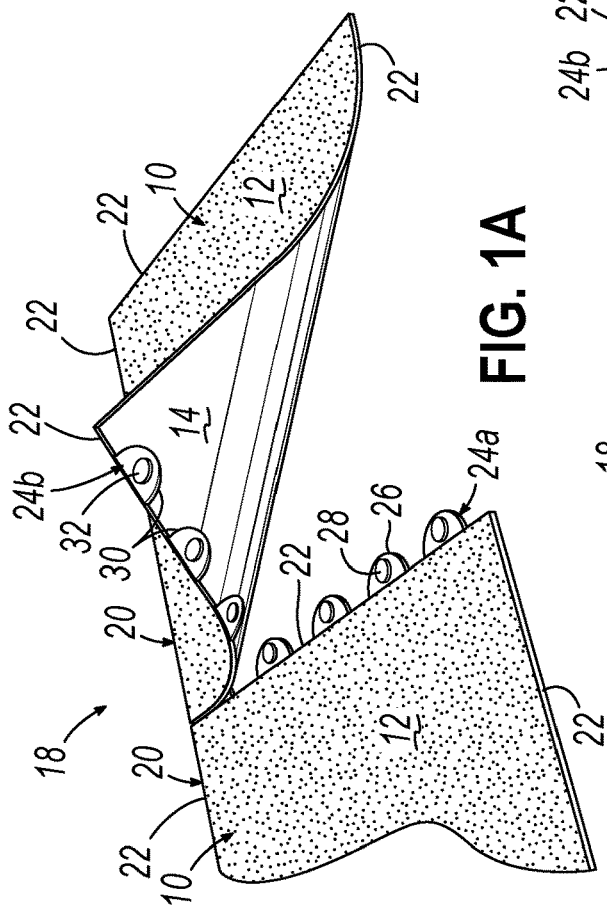
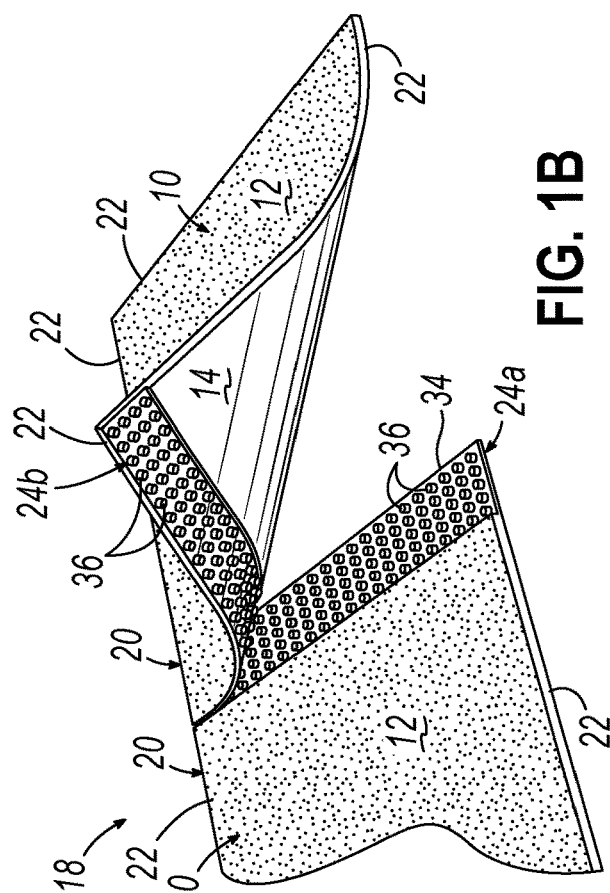

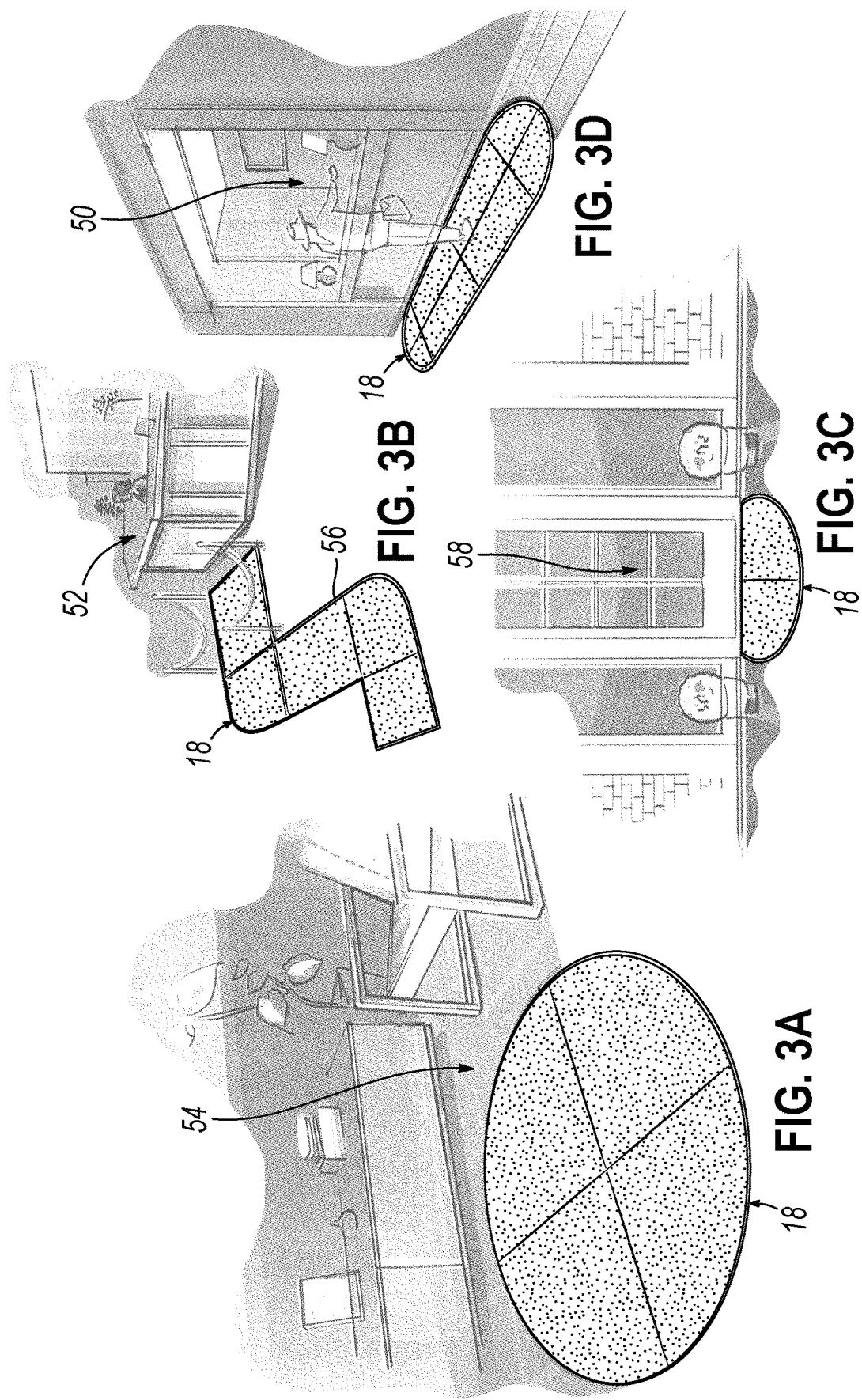

MODULAR MAT SYSTEM, MAT MODULES AND ASSOCIATED CONNECTION METHODS

This claims the benefit of U.S. Provisional Patent Application Ser. No. 62/694,478, filed Jul. 6, 2018 and hereby incorporated by reference in its entirety.

BACKGROUND OF THE INVENTION

This invention relates to a modular mat system. More particularly, this invention relates to a modular mat system which includes individual mat modules arranged and held together in a fixed position so that the assembly may be configured in desired shapes and used as a mat for a floor covering.

Mats are popular as a floor covering material. They offer many advantages over standard roll-type carpet floor covering. The mat pieces can be laid over a floor or other area in a mosaic or grid pattern and can easily be individually removed for cleaning or replacement purposes, when individual mat pieces become soiled or worn.

Individual mat pieces also provide more flexibility in design since they may be swiftly replaced with a different color to suit a particular occasion.

In the past, carpet tile has only been used for wall-to-wall floor covering similar to wall-to-wall carpeting. Complete wall-to-wall placement of the carpet tiles was necessary because lateral support is needed to hold the tiles adjacent one another on the floor in the grid pattern and prevent slippage of one piece relative to adjacent pieces. This support has been provided by the wall base.

There are many situations where full wall-to-wall coverage is not required or desired. In hospitals, for example, because of heavy traffic of heavy rolling stock, large carpeted areas in hallways and rooms are to be avoided. Carpets increase friction and have problems such as carpet wrinkling. Certain entrance areas, though, do require floor coverage for safety and foot cleaning purposes. Often the space to be covered in such applications is an irregular shape and cannot be satisfactorily covered with a standard size and shape mat.

Accordingly, there is a need for a mat system for individual designs and shapes for specific applications.

SUMMARY OF THE INVENTION

The object of this invention is to provide a mat and associated mat system which addresses these and other shortcomings in the prior art.

A mat system comprised of multiple mat modules with interlocking features that allow for separate mat modules to be assembled into different patterns or shapes to cover larger areas as an area mat, define long pathways such as in hallways and customize the shape of the mat may be used to better fit the specific location.

The mat modules are secured to each other to provide larger mat systems with a safer and better-looking transition. The mat modules are constructed such that there is a first connecting arrangement and a second connecting arrangement. These connecting arrangements can be provided on the long edge, the short edge, on all edges, or in particular locations depending on the desired mat system formation or shape. When the mat modules are assembled, the first connecting arrangement on one mat module will assemble to the second connecting arrangement and an adjacent mat module to provide a secure and seamless connection between the mat modules. These connecting features can be integral to the mat modules or separate pieces. If separate pieces, in the case of a deconstructed mat, the connecting features can be the mat rubber bases arranged in an alternating, interlocked pattern relative to the top fabric layer.

In various aspects, the invention is directed to a mat system, mat modules and methods of arranging and assembling the mat modules to form a desired shape or design of a mat system.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIGS. 1A thru 1C are each a perspective view of exemplary connecting arrangements for exemplary mat modules according to various embodiments of this invention;

FIGS. 2A-3D are each a view of a mat systems according to embodiments of this invention, each of which are designed and shaped to a particular environment.

DETAILED DESCRIPTION OF THE INVENTION

Figure 2C:
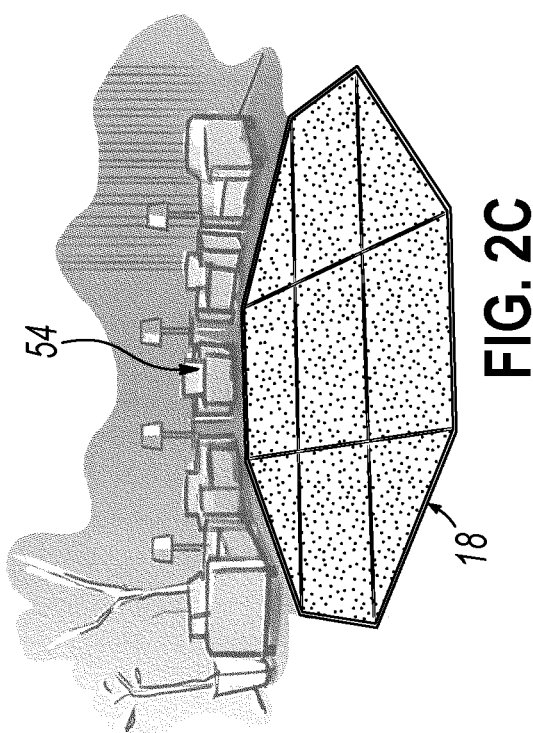
Figure 2D:
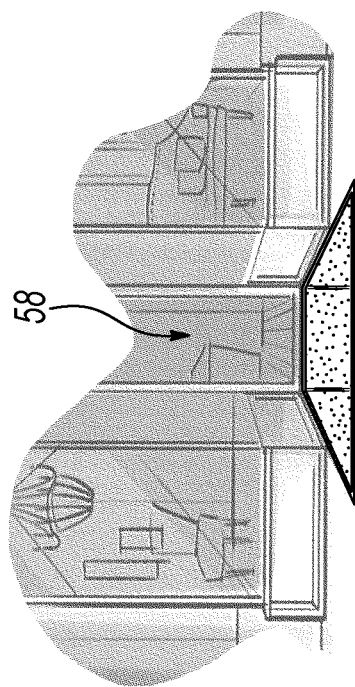
Figure 2B:
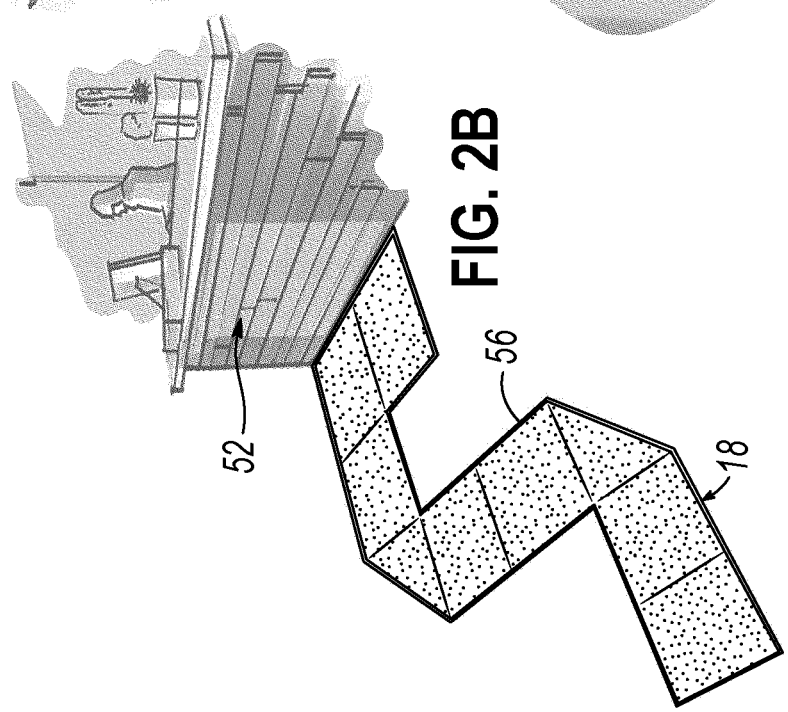
Figure 2A:
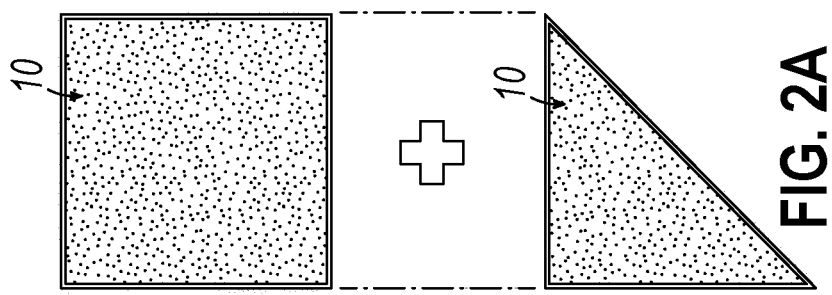
Figure 4A:
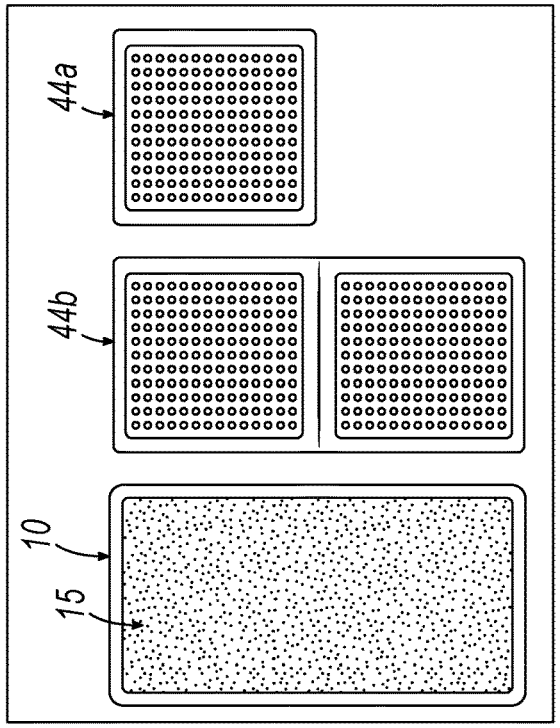
FIGS. 4A-4C are each views of mat modules according to various embodiments of this invention joined together into respective mat systems.
Figure 4B:
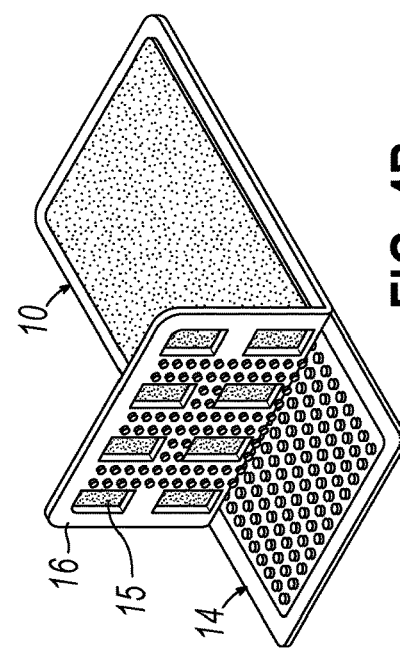
Figure 4C:
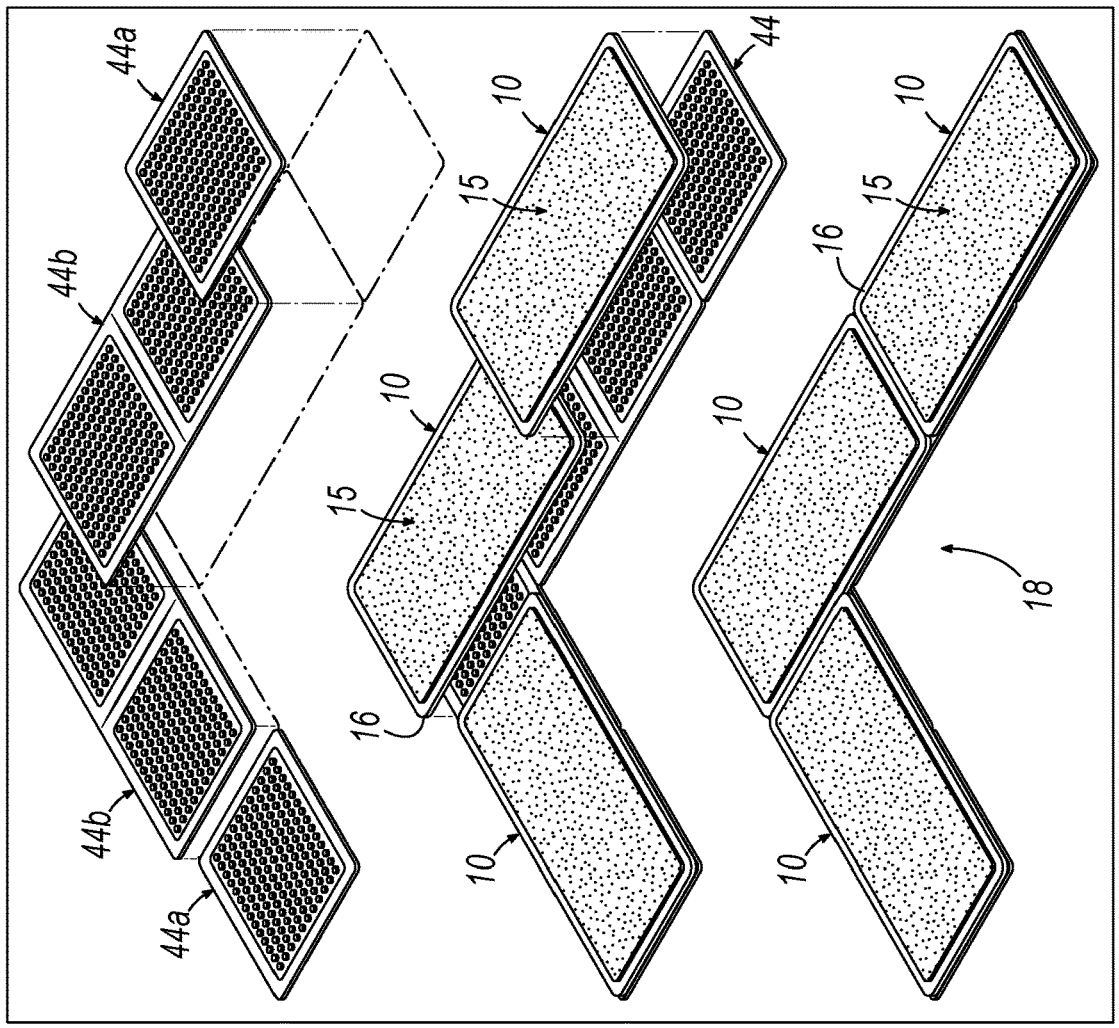

Exemplary embodiments of this invention will be described with reference to the drawings and figures in which like numerals represent like elements throughout the several figures. Referring now to FIG. 1A which illustrates a perspective view of exemplary mat modules 10 according to one embodiment of this invention. The exemplary mat modules 10 include an upper surface 12 and a lower or backing surface 14 for the mat modules 10. The upper surface 12 may have a yarn, carpet or other fabric layer 15 laminated or otherwise bonded to a support layer 16 as shown in FIGS. 4A-4C. While exemplary embodiments of mat modules 10 according to this invention are shown, those of ordinary skill in the art will appreciate that a large variety of other mat module designs, styles, shapes, constructions and configurations according to various aspects of this invention are within the scope of this invention.

Referring to FIGS. 1A-1C, various embodiments of mat modules according to aspects of this invention are shown. Individual mat modules may be assembled together to form a mat system 18 shaped, configured and sized according to a desired presentation as shown in FIGS. 2A-4C. Each mat module 10 has an upper mat surface 12 which is bounded by an outer periphery or perimeter 20. The upper mat surface 12 of each mat module 10 in FIG. 1A is rectangular, and more particularly, square, such that the perimeter 20 is defined by four generally equal length sides 22. However, it will be appreciated by one of ordinary skill in the art that the mat modules 10, perimeter 20 and sides 22 may be of any shape, size, arrangement or configuration within the scope of this invention.

Adjacent mat modules 10 are joined together to form the mat system 18. The mat modules 10 are joined together by first and second connecting arrangements 24a, 24b, each of which may be on each of the mat modules 10. The mat module 10 may have more than one connecting arrangement 24 for connection to multiple adjacent mat modules 10 in the mat system 18. In one embodiment of a connection scheme according to this invention, the first connecting arrangement 24a is a projection 26 extending from a side 22 of a mat module 10. In various embodiments, there may be multiple spaced projections 26 extending from the periphery 20 of the mat surface 12 as shown in FIG. 1A. Each projection 26 may be arcuate or semi-circular and include an upwardly protruding peg 28 which, in the embodiment shown in FIG. 1A, is generally circular.

An adjacent mat module 10 may have a second connecting arrangement 24b in the form of a series of spaced keepers 30 on an undersurface of the mat module 10 adjacent the perimeter 20 thereof. Each keeper 30 according to this embodiment of the invention may have a socket 32 which is sized and shaped to receive therein one of the pegs 28 on the adjacent mat module 10. The individual keepers 30 as the second connecting arrangement 24b are spaced and sized to mate with the projections 26 and pegs 28 of the first connecting arrangement 24a on the adjacent mat module 10. When the second connecting arrangement 24b is overlaid onto the first connecting arrangement 24a of the adjacent mat module 10, the two mat modules 10, 10 are releasably connected together thereby forming a mat system 18 or at least a portion of a mat system 18.

Alternative connecting arrangements 24 are likewise shown in FIG. 1B in which a first connecting arrangement 24a may project from a peripheral side 22 of a mat module 10 in the form of a generally rectangular extension 34 having a series of interlocking combs or nubs 36 projecting upwardly. The adjacent mat module 10 may have a second connecting arrangement 24b which is similar to the first connecting arrangement in which a series of spaced nubs 36 are projecting downwardly on a rectangular field from the lower surface 14 of the mat module 10. When the first and second connecting arrangements 24a, 24b are overlaid with one another and pressed into a mating relationship, the interlocking combs or nubs 36 of the first and second connecting arrangements 24a, 24b join the mat modules 10, 10 together thereby forming a mat system 18 or at least a portion thereof.

A further embodiment of a connecting arrangement 24 according to one aspect of this invention is also shown in FIG. 1C in which each of two adjacent mat modules 10, 10 has a reduced thickness portion 38 adjacent side 22 thereof. The reduced thickness portion 38 may be generally rectangular as shown in FIG. 1C. Each reduced thickness portion 38 is a first or second connecting arrangement 24a, 24b which, in combination with a bridge element 40, joins the two adjacent mat modules 10, 10 together. The first and second connecting arrangements 24a, 24b are positioned to overlie the bridge element 40 which spans the two adjacent mat modules 10, 10. The bridge element 40 may have a series of upwardly projecting bulges or protuberances 42 which engage the surface of the connecting arrangements 24a, 24b and thereby adjoining the adjacent mat modules 10, 10 together into a mat system 18, or at least a portion thereof when the connecting arrangements are laid on top of the bridge element 40 and pressed onto it.

A still further connection arrangement 24 is shown in FIGS. 4A-4C according to various embodiments of this invention in which mat rubber bases 44 are arranged in an interlocking pattern relative to a top fabric layer 15 of a mat module 10 thereby connecting the mat modules 10 into a desired configuration. Specifically, the connecting arrangement 24 may be a square mat rubber base 44A half unit or an elongated rectangular mat rubber base 44B full unit as shown in FIG. 4A. The upper top fabric layer 15 (FIG. 4B) of the mat may likewise be a square half unit or a rectangular full unit similarly sized and shaped to the half unit or rectangular lower base 44a, 44b or other sizes, shapes, arrangements and configurations. The upper fabric layer 15 may include a backing which in one embodiment is a lattice network to provide support to the fabric layer. The rubber bases 44a, 44b are arranged in a pattern to accept on top thereof the top fabric layer 15. As shown in FIG. 4C, three top rectangular-shaped fabric layers 15 are arranged on four rubber bases 44, two of which are rectangular 44b and two of which are square 44a. The rectangular top fabric layers 15 bridge a portion of a rectangular rubber base 44b in a square rubber base 44a on each lateral end of the mat system 18 arranged in FIG. 4C. An additional top fabric layer 15 bridges to rectangular rubber base 44b thereby joining the assembly into a mat system 18. The rubber bases 44 may have a pattern of upstanding nibs which engage with a pattern of downwardly directed nibs on the back of the fabric layer 15 so as to provide for an inter-engaging connection between the base 44 and the fabric layer 15.

It will be appreciated that exemplary connecting arrangements have been shown and disclosed herein and additional connecting arrangements, connecting members, connecting elements and schemes are well within the scope of this invention. As shown in FIGS. 2A-2D and 3A-3D, individual mat modules 10 may be arranged in a mat system 18 which is particularly adapted for a particular environment and/or function. For example, the mat systems 18 may be utilized as a destination 50, at a reception counter 52 or group seating area 54. Moreover, the mat systems 18 may be arranged in a pathway 56 to a reception counter 52 or other desired destination for leading those walking on the mat system 18 to a particular location. Moreover, the mat systems 18 will be utilized as an entrance or exit 58 to a building or doorway as is appropriate. Here again, these are merely exemplary functions, arrangements and utilities for the mat system 18 according to various embodiments of this invention and others are well within the scope of this invention as will be appreciated by one of ordinary skill in the art.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:
1. A mat system comprising:
a plurality of mat modules selectively arranged and interconnected to form the mat system, wherein each of the plurality of mat modules further comprises at least one top layer and at least one base layer wherein the base layer is adapted to be juxtaposed to a floor supporting the mat system and the top layer is selectively coupled to the base layer;
wherein a first quantity of the at least one top layer is different from a second quantity of the at least one base layer;
wherein each of the top layers of the plurality of mat modules and each of the base layers of the plurality of mat modules are sized and configured in a multiple of a half unit and a total of the half units of the top layer equals a total of the half units of the bottom layer in the mat system;
a plurality of first connecting arrangements each located on a first mat module of a first set of the plurality of mat modules; and a plurality of second connecting arrangements each located on a second mat module of a second set of the plurality of mat modules;

wherein the first connecting arrangement and second connecting arrangement are selectively coupled to releasably join the associated mat modules and form the mat system.

2. The mat system of claim 1 wherein the plurality of mat modules are not all of the same shape.

3. The mat system of claim 1 wherein the first and second connecting arrangements are of different complementary shapes.

4. The mat system of claim 1 wherein the first and second connecting arrangements are of the same complementary shape.

5. The mat system of claim 1 wherein the first connecting arrangement is on an upper face of the associated base layer and the second connecting arrangement is on a lower face of the associated top layer.

6. The mat system of claim 1 wherein the mat modules are all of the same shape.

7. The mat system of claim 1 wherein a first shape of the mat system is reconfigurable to a second shape of the mat system.

8. The mat system of claim 1 wherein selected ones of the base layer have a different configuration than the top layer coupled thereto.

9. The mat system of claim 1 wherein selected ones of the base layer are coupled to multiple ones of the top layer.

10. The mat system of claim 1 wherein the first and second connecting arrangements are similarly configured, the mat system further comprising;
a third connecting arrangement on the base layer which is selectively coupled to the first and second connecting arrangements of a pair of adjacent mat modules.

11. A mat system comprising:
a plurality of mat modules selectively arranged and interconnected to form the mat system, wherein each of the plurality of mat modules further comprises at least one top layer and at least one base layer wherein the base layer is adapted to be juxtaposed to a floor supporting the mat system and the top layer is selectively coupled to the base layer;
wherein a first quantity of the at least one top layer is different from a second quantity of the at least one base layer;
wherein each of the top layers of the plurality of mat modules and each of the base layers of the plurality of mat modules are sized and configured in a multiple of a half unit and a total of the half units of the top layer equals a total of the half units of the bottom layer in the mat system;
a plurality of first connecting arrangements each located on a first mat module of a first set of the plurality of mat modules; and
a plurality of second connecting arrangements each located on a second mat module of a second set of the plurality of mat modules;
wherein the first connecting arrangement and second connecting arrangement are selectively coupled to releasably join the associated mat modules and form the mat system;
wherein the plurality of mat modules are not all of the same shape.

12. The mat system of claim 11 wherein the first and second connecting arrangements are of different complementary shapes.

13. The mat system of claim 11 wherein the first and second connecting arrangements are of the same complementary shape.

14. The mat system of claim 11 wherein the first connecting arrangement is on an upper face of the associated base layer and the second connecting arrangement is on a lower face of the associated upper layer.

15. The mat system of claim 11 wherein a first shape of the mat system is reconfigurable to a second shape of the mat system.

16. The mat system of claim 11 wherein selected ones of the base layer have a different configuration than the top layer coupled thereto.

17. The mat system of claim 11 wherein selected ones of the base layer are coupled to multiple ones of the top layer.

18. The mat system of claim 11 wherein the first and second connecting arrangements are similarly configured, the mat system further comprising;
a third connecting arrangement on the base layer which is selectively coupled to the first and second connecting arrangements of a pair of adjacent mat modules.

19. The mat system of claim 1 wherein the first and second connecting arrangements are concealed when the associated mat modules are joined to form the mat system.

20. The mat system of claim 11 wherein the first and second connecting arrangements are concealed when the associated mat modules are joined to form the mat system.

21. A mat system comprising:
a plurality of mat modules selectively arranged and interconnected to form the mat system, wherein each of the plurality of mat modules further comprises at least one top layer and at least one base layer wherein the base layer is adapted to be juxtaposed to a floor supporting the mat system and the top layer is selectively coupled to the base layer;
wherein a first quantity of the at least one top layer is different from a second quantity of the at least one base layer;
wherein selected ones of the top layer further include a fabric layer coupled to a support layer and the support layer comprises a lattice configuration defining a plurality of openings in the support layer;
a plurality of first connecting arrangements each located on a first mat module of a first set of the plurality of mat modules; and
a plurality of second connecting arrangements each located on a second mat module of a second set of the plurality of mat modules;
wherein each of the top layers of the plurality of mat modules and each of the base layers of the plurality of mat modules are sized and configured in a multiple of a half unit and a total of the half units of the top layer equals a total of the half units of the bottom layer in the mat system;
wherein the first connecting arrangement and second connecting arrangement are selectively coupled to releasably join the associated mat modules and form the mat system.

22. The mat system of claim 21 wherein selected ones of the base layer are coupled to multiple ones of the top layer.

* * * * *